3,285,980
PROCESS FOR THE PRODUCTION OF VINYL CHLORIDE

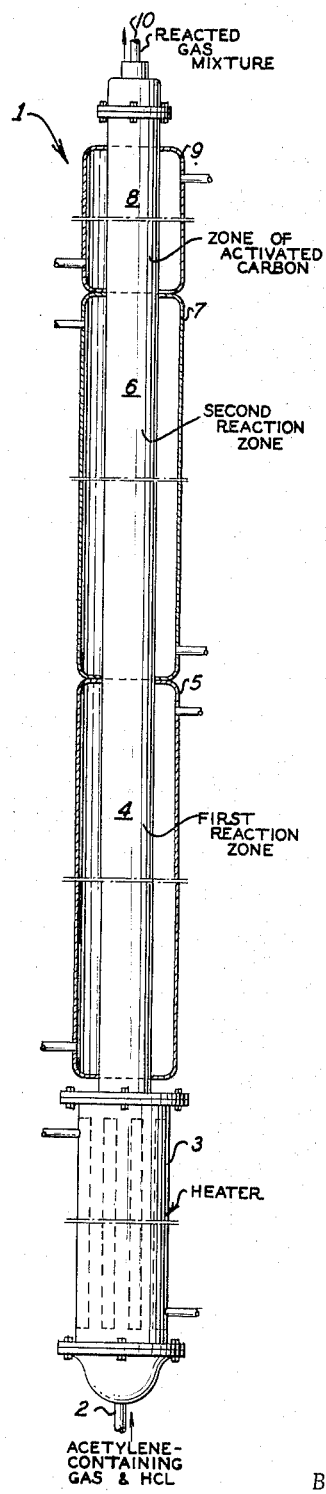

Heinrich Brachert, Oberlar, and Hans-Ewald Konermann, Siegburg, Germany, assignors to Dynamit Nobel, A.G., Troisdorf, Bezirk Cologne, Germany
Filed May 1, 1961, Ser. No. 113,586
Claims priority, application Germany, May 2, 1960, D 33,244
10 Claims. (Cl. 260—656)

This invention relates to a novel catalytic process for the production of vinyl chloride and refers more particularly to the reaction of acetylene-containing gases with hydrogen chloride in the presence of a solid mercury catalytic material.

The reaction of acetylene with hydrogen chloride in the presence of catalysts, such as mercury chloride on activated carbon for producing vinyl chloride, is known. In the known process, the mixture of the starting gases is conducted through a tubular reactor over the catalyst. The considerable reaction heat thereby liberated on the one hand promotes the conversion, but on the other hand must not be allowed to accumulate, but has to be drawn off as through cooling if thermal decomposition reactions, etc., are to be avoided. In order to permit a stable, practicable operation, control of the thermal reaction by interrelating the cooling agent temperature, conversion speed, dimensions of the reactor and type of catalyst must be undertaken. The catalyst must be possessed of a high continuous load capacity and additionally must be comparatively stable to heat. However, even under the most carefully induced conditions, the conversion of the starting gases is incomplete and unsatisfactory since with the flow speeds as used the gases are admitted into the reaction zone as a temperature too low to bring about reaction or because the gases flowing closest to the cooled reactor wall have a lower temperature than the actual reaction temperature whereby an ordinary homogeneous reaction is not possible. Further, the effectiveness of the type of catalyst used decreases perceptibly with even low residual acetylene contents as their activity is directed to continuous load and not to complete conversion.

It has recently been proposed that in the synthesis of vinyl chloride there be employed thermal reaction or cracking products of hydrocarbon oils. Thus, for example, acetylene-containing gases in which the acetylene constitutes 5–25 vol. percent of the gas produced in the cracking of hydrocarbon oils have been employed for direct reaction with hydrogen chloride to prepare vinyl chloride. Through use of gases containing acetylene of the aforesaid type there is moderated the strong heat development, but, on the other hand, it is necessary to increase the flow speed in order to arrive at an approximately equal conversion per time unit. Since, however, the reaction zone's length is a constant, time of stay in the reaction zone is decreased so that a substantially complete conversion is even more difficult to arrive at. For reaction using the conventional continuous load catalysts, a minimum temperature is necessary. If too mild temperatures are employed, the conversion is incomplete and finally no reaction at all is possible. At too high temperatures, the catalyst is destroyed or deleteriously affected so that catalytic activity decreases or is entirely absent. Since, however, a practically complete conversion is a prerequisite of the process, the above procedures have not proved to have economical value. When a starting gas having an acetylene content of 10% is utilized, a residual content of 1% acetals remains amounting to an acetylene loss of 10%. A total conversion of the acetylene is also desirable as it facilitates the purification of the vinyl chloride which must in connection with the further processing thereof by completely free from acetylene.

This invention has for its object the conversion of acetylene with hydrogen chloride into vinyl chloride with higher yields and higher ultimate conversions than heretofore obtainable.

Another object is the conversion of acetylene with hydrogen chloride into vinyl chloride with higher yields and higher ultimate conversions than heretofore obtainable under mild and economic conditions.

Other objects will be apparent as the description proceeds.

The invention provides a new and different method of producing vinyl chloride, which is based upon the discovery that by effecting the reaction of an acetylene-containing gas and hydrogen chloride in two thermally controlled stages in the presence of two different and progressively more active mercury catalysts, there are obtained higher yields of vinyl chloride and higher ultimate conversions of acetylene than heretofore obtainable.

The inventive process comprises preheating the acetylene-containing gas and preferably acetylene-containing gas formed in cracking petroleum oils and hydrogen chloride to a temperature of 50–100° C. and passing the gas mixture to a first reaction zone provided with means for externally cooling the same in contact with a catalyst comprising a mercury salt, effecting the contacting at a temperature between about 110 and 170° C., thereafter passing the gas mixture into a second reaction zone provided with means for externally heating the same in contact with a more active catalyst comprising a mercury salt, such as, for example, a vanadate, effecting the contacting between a temperature of 110 and 170° C., and thereafter preferably passing the reaction gas mixture which now contains vinyl chloride and substantially no acetylene into and through a cooled zone containing activated carbon, which serves to remove from the reaction gas any mercury catalyst which may have undergone sublimation.

In order to obtain the temperature at which thermal conversion proceeds in the first reaction zone, the reaction mixture is preheated so that in the first reaction zone where the temperature is maintained at between 110 and 170° C., the reaction sets in at once. The reaction heat liberated is drawn off through suitable externally-arranged cooling means so that overheating is avoided, thereby the catalyst activity and the long life period of the catalyst is preserved. On passage through the second heatable reaction zone provided with the more highly active catalyst and by supplying from an external source the heat required to maintain the effective reaction temperature any residual acetylene not converted in the preceding reaction zone is completely converted into vinyl chloride. Because the quantity of acetylene has been sharply reduced in the second reaction zone in comparison with that present in the preceding reaction zone, the reaction heat liberated in the conversion of the residual acetylene does not alone suffice to maintain the gas mixture at the reaction temperature; the reaction temperature lying within the range of 110–170° C. Thereafter, the reaction gas mixture containing the vinyl chloride is cooled to 20–30° C. and simultaneously passes through an activated carbon layer. In this manner a substantially complete conversion of the acetylene to vinyl chloride is obtained.

The drawing illustrates diagrammatically an apparatus for practicing the process of the present invention.

One embodiment of the process may be practiced as is shown in the drawing.

The apparatus consists of a tubular reactor 1. The acetylene-containing gas in admixture with hydrogen chloride enters into the reactor through gas inlet nozzle 2. The gas mixture passes through a heating element wherein it is heated to a temperature of from about 50–100° C. The heated mixture thereupon passes into a first reaction zone 4 and in contact with a first catalyst which consists of a conventional mercury salt preferably supported on activated carbon. The tubular reactor 1 is provided in the area of the first catalyst zone with a jacket 5 an with associated means whereby the jacket temperature may be maintained at from 20–120° C. There is subsequently arranged a second reaction zone 6 wherein the catalyst consists of a highly active mercury salt catalyst again preferably on an activated carbon support. The second contact zone is similarly provided with a jacket 7 and associated means whereby the jacket temperature may be maintained between 110 and 170° C. Following the second catalyst zone and at the end of the reactor there is arranged a zone of activated carbon 8; this zone likewise being surrounded by a jacket 9 so that the activated carbon may be cooled. The reacted gas mixture is discharged through conduit 10.

The following specific examples are introduced in order to illustrate but not unduly to limit the invention.

*Example 1*

A tubular reactor is described having a length of 3 m. and a diameter of 10 cm., in the first reaction zone of which there is employed as catalyst activated carbon impregnated with mercury chloride and in the second reaction zone there is employed as catalyst mercury vanadate on activated carbon, is charged by means of a blower from a gasometer with 1 m.³/hr. of a cracking gas having an 11.3 vol. percent acetylene content and 118 l./hr. of dry hydrogen chloride. In the area of the first reaction zone there is circulated hot water so as to produce in the interior of the reactor in this zone a temperature of 80–90° C. After a short time the reaction starts and the temperature in the tubular reactor begins to rise. The temperature of the water in the jacket is thereupon lowered so that a constant reaction temperature of about 140–150° C. established. The reaction proceeds evenly at this temperature. The second reaction zone containing the more active mercury catalyst is heated to 110° C. and maintained at this temperature. The reaction yields with a starting gas composition containing 11.3 vol. percent acetylene in a conversion to 11.3 vol. percent vinyl chloride. Residual acetylene is no longer to be detected.

*Example 2*

The process of Example 1 is repeated but the composition of the cracking gas with respect to acetylene amounts to 10.2 vol. percent in this instance. The cracking gas throughput is 1085 l./hr. and that of the hydrochloride acid 115 l./hr., the temperature of the first reaction zone is 169° C., the jacket tempearture of the first reaction zone 14° C., the jacket temperature of the second reaction zone 150° C., the yield of vinyl chloride amounts to 10.1 vol. percent; acetylene 0.0 vol. percent.

*Example 3*

The process of Example 1 is again repeated but, in this instance, the acetylene content of the cracking gas is 7.2 vol. percent. The cracking gas throughput is 1205 l./hr., that of the hydrochloric acid 90 l./hr.; the temperature of the first reaction zone is 156° C., the jacket temperature 105° C., the jacket temperature of the second reaction zone being maintained at 154° C. The yield of vinyl chloride is 7.15 vol. percent; acetylene 0.0 vol. percent.

We claim:

1. In a process for the preparation of vinyl chloride by reaction of an acetylene-containing gas with hydrogen chloride, the steps to substantially completely convert the acetylene into vinyl chloride, of preheating a mixture of a gas containing acetylene and hydrogen chloride in an amount in stoichiometric excess to a temperature of from about 50–100° C., contacting the preheated gas mixture in a first reaction zone with mercury chloride supported on activated carbon as catalyst at a temperature between about 110 and 170° C. and thereafter contacting the gas mixture consisting essentially of the gaseous efflux of said first reaction zone in a second reaction zone with mercury vanadate supported on activated carbon as catalyst at a temperature between about 110 and 170° C.

2. Process according to claim 1, wherein said acetylene-containing gas is formed in cracking a petroleum oil.

3. Process according to claim 1, which comprises passing the gas mixture from the second reaction zone into and through a third zone containing activated carbon while simultaneously cooling.

4. Process according to claim 2, wherein said cracking gas has a content of from 5 to 25 vol. percent of acetylene.

5. Process according to claim 4, wherein said cracking gas has a content of 11.3 vol. percent of acetylene.

6. Process according to claim 4, wherein said cracking gas has a content of 10.2 vol. percent of acetylene.

7. Process according to claim 2, wherein said cracking gas has a content of 7.2 vol. percent of acetylene.

8. Process according to claim 1, which comprises maintaining the reaction temperature in the first reaction zone by external cooling.

9. Process according to claim 1, which comprises maintaining the reaction temperature in the second reaction zone by external heating.

10. In a process for the preparation of vinyl chloride by reaction of an acetylene-containing gas with hydrogen chloride, the steps to substantially completely convert the acetylene into vinyl chloride of preheating a mixture of a gas containing acetylene and hydrogen chloride in an amount in stoichiometric excess to a temperature of from about 50–100° C., contacting the preheated gas mixture in a first reaction zone with mercury chloride supported on activated carbon as catalyst at a temperature between about 110 and 170° C., thereafter contacting the gas mixture consisting essentially of the gaseous efflux of said first reaction zone in a second reaction zone with mercury vanadate supported on activated carbon as catalyst at a temperature between about 110 and 170° C. and maintaining the reaction temperatures in said first and second reaction zones by external cooling and external heating respectively.

References Cited by the Examiner

UNITED STATES PATENTS

| | | | |
|---|---|---|---|
| 2,265,509 | 12/1941 | Boesler et al. | 260—656 |
| 2,329,795 | 9/1943 | Stanley et al. | 260—656 |
| 2,467,013 | 4/1949 | De Vassiere | 260—656 |
| 2,562,796 | 7/1951 | Koch | 260—78 |
| 2,830,102 | 4/1958 | Kobe et al. | 260—656 |

OTHER REFERENCES

Barton et al.: J. Soc. Chem. Ind., vol. 69, pp. 75–79 (1950).

Hougen et al.: Chem. Process Principles, Part 3, Kinetics and Catalysis, Wiley & Sons (New York, 1947, p. 1032).

Naugatuck Chemical, Petroleum Refiner, December 1955, p. 189.

LEON ZITVER, *Primary Examiner.*

ALPHONSO D. SULLIVAN, *Examiner.*

J. WILLIAMS, K. V. ROCKEY, *Assistant Examiners.*